US008045791B2

(12) United States Patent
Chang et al.

(10) Patent No.: US 8,045,791 B2
(45) Date of Patent: Oct. 25, 2011

(54) SYSTEM AND METHOD FOR MEASURING DIGITAL IMAGES OF A WORKPIECE

(75) Inventors: Chih-Kuang Chang, Taipei Hsien (TW); Xiao-Chao Sun, Shenzhen (CN); Zhong-Kui Yuan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1009 days.

(21) Appl. No.: 11/941,974

(22) Filed: Nov. 19, 2007

(65) Prior Publication Data
US 2008/0240546 A1 Oct. 2, 2008

(30) Foreign Application Priority Data
Mar. 26, 2007 (CN) .......................... 2007 1 0200328

(51) Int. Cl.
*G01K 9/00* (2006.01)
(52) U.S. Cl. ........................................ 382/152; 345/629
(58) Field of Classification Search .................. 382/298, 382/141–152; 345/629
See application file for complete search history.

(56) References Cited

U.S. PATENT DOCUMENTS

| | | | | |
|---|---|---|---|---|
| 4,878,183 A * | 10/1989 | Ewart | ........................... | 345/428 |
| 5,654,807 A * | 8/1997 | Miyaza | ........................ | 358/450 |
| 6,047,082 A * | 4/2000 | Rhody et al. | .................. | 382/141 |
| 6,128,416 A * | 10/2000 | Oura | ............................. | 382/284 |
| 6,205,259 B1 * | 3/2001 | Komiya et al. | ............... | 382/284 |
| 6,292,593 B1 * | 9/2001 | Nako et al. | .................... | 382/284 |
| 6,927,863 B2 | 8/2005 | Gurny-Brosch et al. | | |
| 2004/0252884 A1 * | 12/2004 | Foote et al. | .................... | 382/162 |
| 2005/0174613 A1 * | 8/2005 | Tan | .............................. | 358/486 |

* cited by examiner

*Primary Examiner* — Tarifur Chowdhury
*Assistant Examiner* — Michael P Lapage
(74) *Attorney, Agent, or Firm* — Altis Law Group, Inc.

(57) ABSTRACT

A system and method measures digital images of a workpiece using a measuring computer and a client computer. The measuring computer reads each of the digital images of the workpiece from a source file, and merges all the images to generate a combined image of the workpiece. An object to be measured is selected from the combined image, and an image of the selected object is extracted from the combined image. The client computer measures the selected object on the extracted image, and displays measuring results of the selected object.

7 Claims, 10 Drawing Sheets

| Image name | Size | Array of Bytes | Center point Coordinates |
|---|---|---|---|

FIG. 2

SYSTEM AND METHOD FOR MEASURING DIGITAL IMAGES OF A WORKPIECE

BACKGROUND OF THE INVENTION

1. Field of the Invention

The present invention relates to a system and method for measuring digital images of a workpiece.

2. Description of Related Art

Generally, measuring equipments, are used by development and production to improve production quality. With the improvement of measuring equipment precision, measuring equipment becomes more complex to configure and more difficult to operate.

More recently, there is three-D measuring equipment which has a high precision and a high speed in measuring physical dimensions and geometric tolerances of a production. Normally, to measure physical dimensions and geometric tolerances of a product with a high precision and a high speed, the three-D measuring equipment is employed and programmed for a measuring task with a computer. The computer is configured in the three-D measuring equipment and works with the three-D measuring equipment together.

Standard CCDs are used in the three-D measuring equipment for capturing the images of the production. The standard CCD can identify a pixel corresponding to the product whose length is about 0.01 millimeter. If the resolution of a computer display is 1024 pixels*768 pixels, the image of the workpiece is only displayable up to 10 millimeters in its length. However, when there is a larger workpiece that needs to be measured on a measuring machine, the measuring engineer has to capture a series of images of the workpiece for measurement, and the series of images occupy plenty of memory space.

In this way, it is time consuming and it is worse especially for a user to measure a plurality of larger workpieces on the computer together with the three-D measuring equipment.

What is needed, therefore, is a system and method which can measure images of a workpiece effectively.

SUMMARY OF THE INVENTION

A system for measuring digital images of a workpiece includes a client computer for measuring the images. The client computer includes an image merging module, a selecting module, an image extracting module, and a measuring module. The images merging module is configured for merging all the images in a source file to generate a combined image of the workpiece according to center point coordinates of each of the captured images. The selecting module is configured for selecting an object to be measured on the combined image. The image extracting module is configured for extracting an image of the selected object from the combined image. The measuring module is configured for measuring the selected object on the extracted image. And the client computer connects to a measuring computer for downloading the digital images.

A computer-based method for measuring digital images of a workpiece includes: reading each of images of different parts of the workpiece from a source file and merging all the images to generate a combined image of the workpiece; selecting an object to be measured on the combined image; extracting an image of the selected object from the combined image; and measuring the selected object on the extracted image and displaying measuring results.

Other advantages and novel features of the present invention will become more apparent from the following detailed description of preferred embodiments when taken in conjunction with the accompanying drawings.

BRIEF DESCRIPTION OF THE DRAWINGS

FIG. 2 is a schematic diagram of a memory of an image retrieving card for storing the digital images in accordance with the preferred embodiment;

DETAILED DESCRIPTION OF THE INVENTION

Figure 1:
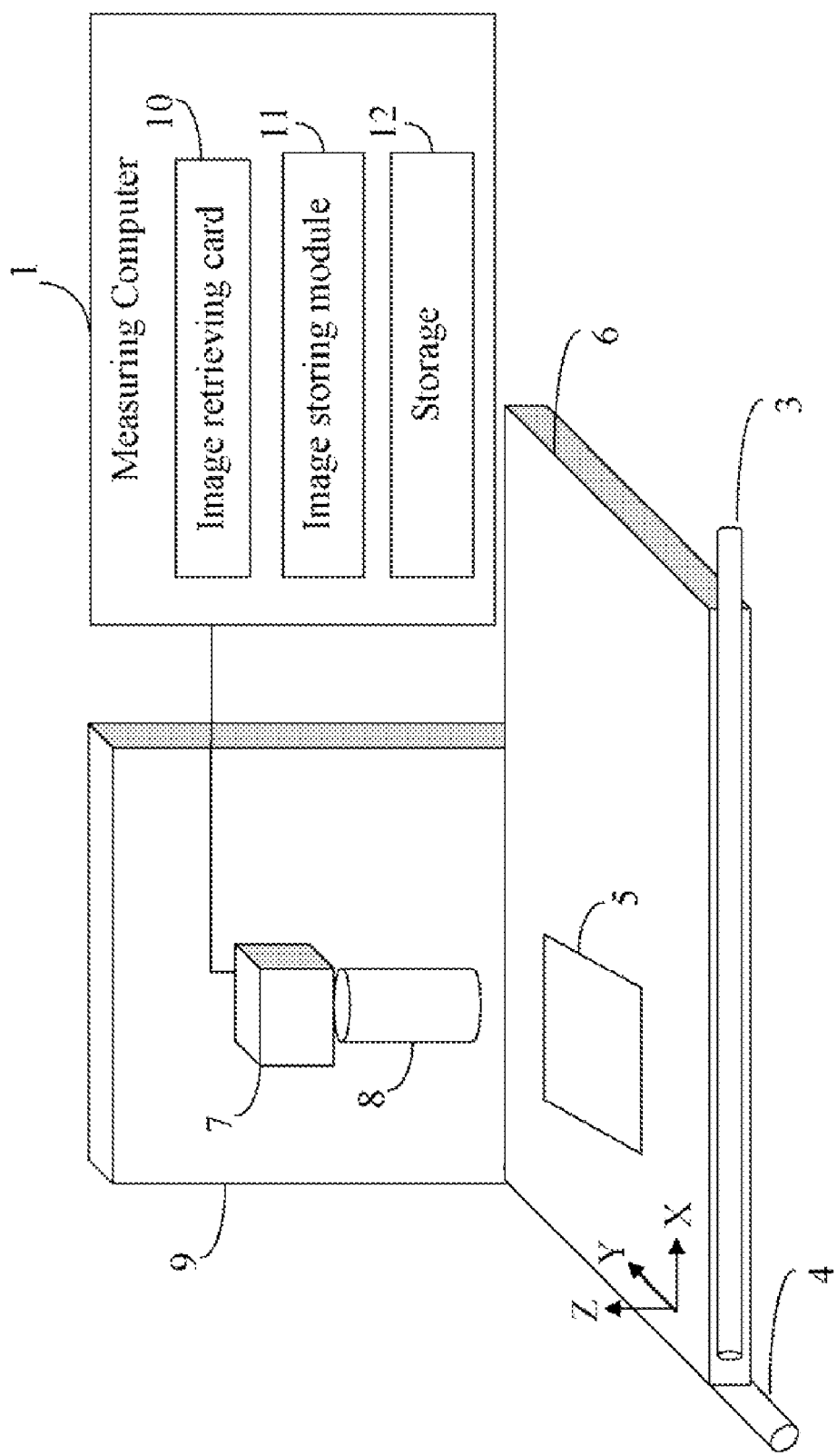
FIG. 1 is a schematic diagram of a system for capturing digital images of a workpiece and storing the digital images in a source file in accordance with a preferred embodiment.

FIG. 1 is a schematic diagram of a system for capturing digital images of a workpiece and storing the digital images in a source file in accordance with a preferred embodiment. The system typically includes a measuring computer 1 and a measuring machine 9 for receiving a workpiece 5 thus, measuring the workpiece 5. The measuring machine 9 includes a charged coupled device 7 (hereinafter, the "CCD 7"), an optical lens 8, and a platform 6. The measuring computer 1 mainly includes an image retrieving card 10, an image storing module 11, and a storage 12.

The charged coupled device (CCD) 7 fixed along a Z-axis direction of the measuring machine 9 captures a series of black and white digital images (hereinafter "images") of the workpiece 5, and records center point coordinates of the images. The center point of each of the images reflects a location of the image relative to the origin coordinates measured in a physical standard unit of the measuring machine 9. The CCD 7 includes the optical lens 8 that focuses on the workpiece 5 for capturing the images of different parts of the workpiece 5.

The measuring machine 9 includes an X-axis manual rocker 3, a Y-axis manual rocker 4, and a Z-axis manual rocker (not shown). The X-axis manual rocker 3 may control the platform 6 to move in the direction of left and right. The Y-axis manual rocker 4 may control the platform 6 to move in the direction of back and forth. The platform 6 is moved and controlled by the X-axis manual rocker 3 and the Y-axis manual rocker 4. The workpiece 5 is received by the platform 6, thus, following the movement of the 6. The CCD 7 captures the digital images of the workpiece 5 on the platform 6 by focusing on the workpiece 5.

The measuring computer 1 is connected with the CCD 7 via a data line. The CCD 7 transmits all the images and the center point coordinates of the images to a memory of the image retrieving card 10 through the data line. A schematic diagram of the memory of the image retrieving card 10 for storing the images is illustrated in FIG. 2. Each of the images is stored in the memory as a bitmap (BMP) file. The BMP file may be 8 bits, 16 bits, 24 bits, or 32 bits. In the preferred embodiment, the images in the memory are all black and white digital images. Each image consists of many pixels and each of the pixels has three bytes of red-green-blue (RGB) color information. For instance, if an exemplary digital image is 1376 pixels wide and 1032 pixels high, the exemplary digital image would have 1376 pixels*1032 pixels; or 1420032 pixels. Each of the pixels is further represented with three bytes of color information. Thus, the exemplary digital image would occupy about 1420032 pixels*3; or 4.16 M bytes. The color information of each of the pixels consists of a red color value, a green color value, and a blue color value. Each of the color values is one byte. The red color value, the green color value, and the blue color value of the each pixel uses a same scale and can be 0~255. The red color value, the green color value, and the blue color value of each of the pixels are equal. Each BMP file contains: a bitmap-file header and an array of bytes. The bitmap-file header contains information such as an image name and an image size. The array of bytes is also known as a bitmap data. The bitmap data holds data of each of the pixels of the image, and each of the pixels has three bytes of red-green-blue (RGB) color information as above-mentioned. The center point coordinates of the images are measured in a physical standard unit such as millimeters or inches.

The image storing module 11 is configured for reading one image from the memory, reading a color value (either of the red color value, the green color value, and the blue color value) of each of the pixels of the image, and storing the read color value of each pixel of the image in a temporary array A representing one image's color information allocated by the storage 12. The image storing module 11 is further configured for reading the center point coordinates of the image from the memory and storing the center point coordinates of the image and the temporary array A as a record in the source file on the storage 12. The image storing module 11 is further configured for storing the source file into a client computer 2. The temporary array A is used for temporarily storing one byte of the three bytes' color information of all pixels in an image.

The source file is a binary file, which includes at least one record. Each record corresponds to one image. For instance, if there are 10 images, then the source file includes 10 records. The source file of the exemplary digital image would only occupy about 1420032 pixels*1*10; or 13.87 Mbytes. However, if the 10 images are separately stored in the storage 12, the 10 images occupy space of the storage 12 about 1420032 pixels*3*10; or 41.6 Mbytes. Meanwhile, the 10 images are stored in the source file, thus counts of images is reduced from 10 to 1. Consequently, the preferred system and method reduces the memory space needed in the storage 12 for storing the 10 images. The image storing module 11 is configured for storing information of height and width of one image in the source file. The information of height and width of all the images is the same because that the same CCD 7 captures each of the images.

The system may also include a display unit (not shown) connected to the measuring computer 1. The display unit provides an interface for receiving instructions input by a user, sending the instructions to the measuring computer 1 to capture the images of the different parts of the workpiece 5 via the image retrieving card 10, and displaying the images of the workpiece 5 to the user.

Figure 3:
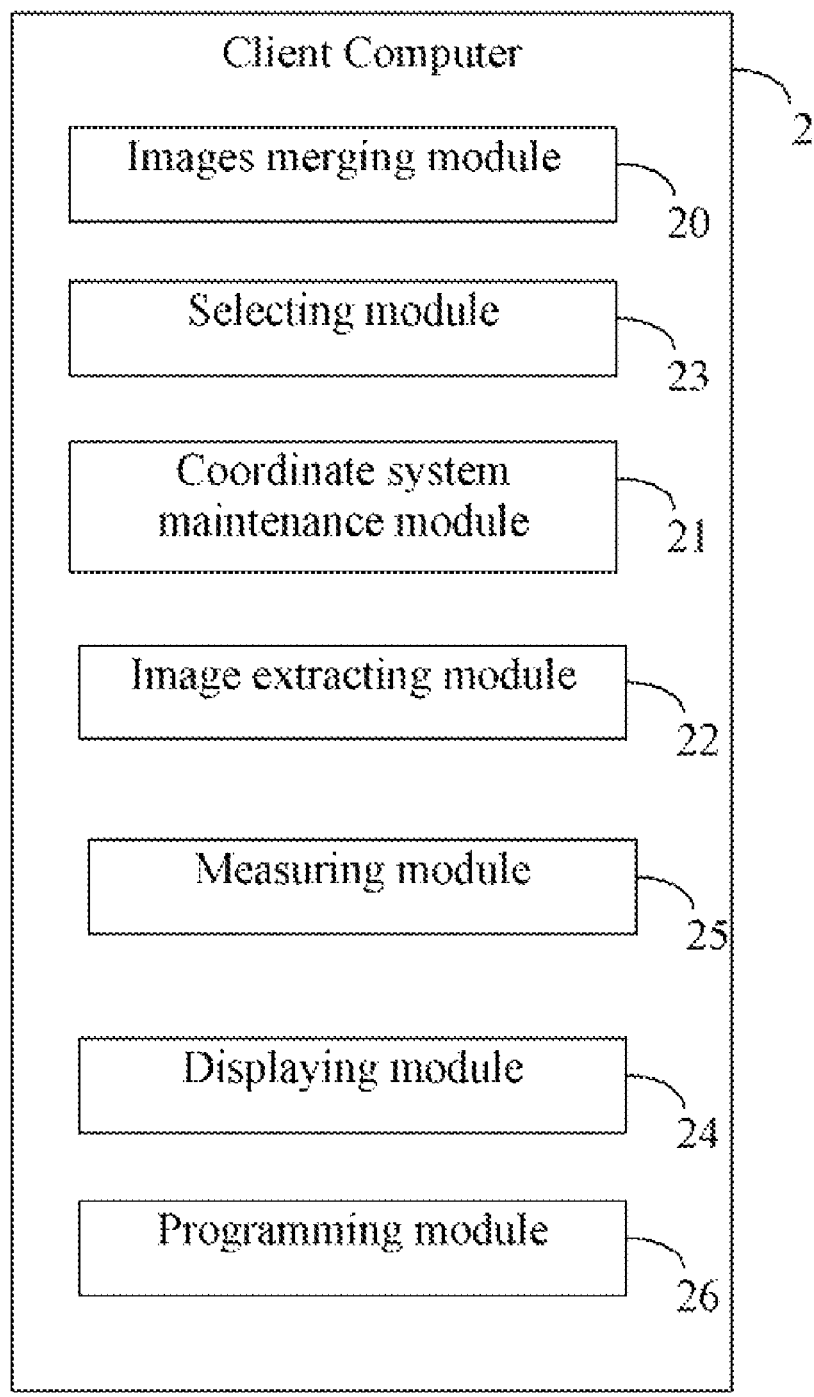
FIG. 3 is a schematic diagram of function modules of a system for measuring the digital images of the workpiece.

FIG. 3 is a schematic diagram of function modules of a system for measuring the digital images of the workpiece. The system may be installed in the client computer 2, which mainly includes an image merging module 20, a selecting module 23, a coordinate system creating module 21, an image extracting module 22, a measuring module 25, a displaying module 24, and a programming module 26.

According to the center point coordinates of the images, the image merging module 20 is configured for merging the images stored in the source file of the workpiece 5 to generate a combined image. The combined image is continuous view of the workpiece surface.

The selecting module 23 is configured for selecting an object to be measured on the combined image by a measuring engineer.

The coordinate system maintenance module 21 is configured for constructing a new coordinate system according to predetermined elements, which include datum mark, datum line, and datum plane etc. The coordinate system maintenance module 21 is also configured for converting original coordinates of measuring points on the selected object into coordinates based on the new coordinate system.

The image extracting module 22 is configured for extracting a selected image of the selected object from the combined image. The extracted image may be one of the images captured by the CCD 7, and is stored in the source file. The extracted image may also be a new image centers on the selected object, and made out of several portions of the images that collectively forms the selected image. The height and width of the new image are the same as each of the images.

The measuring module 25 is configured for measuring the selected object on the extracted image with measuring tools.

The displaying module 24 is configured for displaying the combined image and the extracted image, displaying and recording the selected objects and measured results, and displaying and recording an origin coordinates of a current coordinate system.

The programming module 26 is configured for recording measuring procedures, in order, such as selecting the measuring tools, or calculating a length of a line segment, i.e., and saving all of the measuring procedures into a measuring program. The measuring program can be invoked to perform the measuring procedures automatically.

Figure 4:
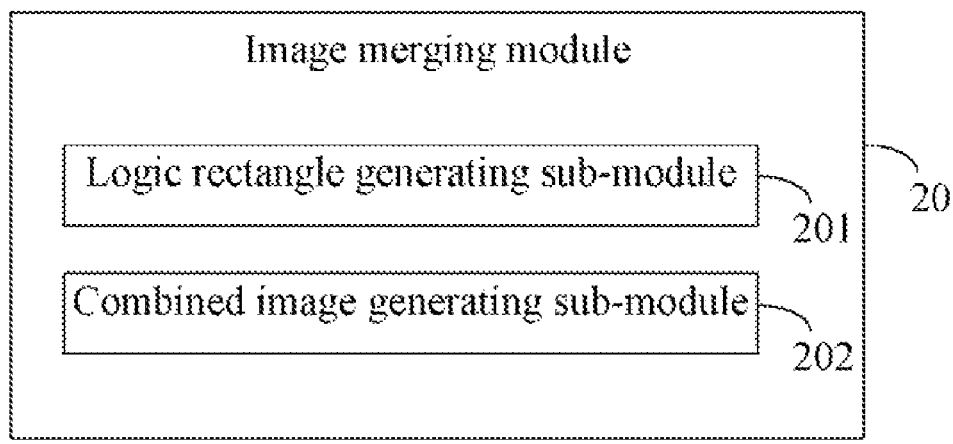
FIG. 4 is a schematic diagram of sub modules of the image merging module in FIG. 3.

FIG. 4 is a schematic diagram of sub function modules of the image merging module 20.

The image merging module 20 includes a logic rectangle generating sub-module 201 and a combined image generating sub-module 202.

The logic rectangle generating sub-module 201 is configured for converting the center point coordinates of the images in the source file from the physical standard unit to pixels unit, generating a pixel rectangle rcB for each of the images according to the heights and widths of the images, merging all the generated pixel rectangles rcB according to their center point coordinates in pixels to generate a logic rectangle rcA, and calculating a reduction scale S of the logic rectangle rcA. If the length of the rcA is E, the width of the rcA is F, the length of the rcB is M, and the width of the rcB is N, then S equals the greater one of E/M and F/N, that is, if E/M>F/N, S=E/M; otherwise, if E/M<F/N, S=F/N.

Figure 5:
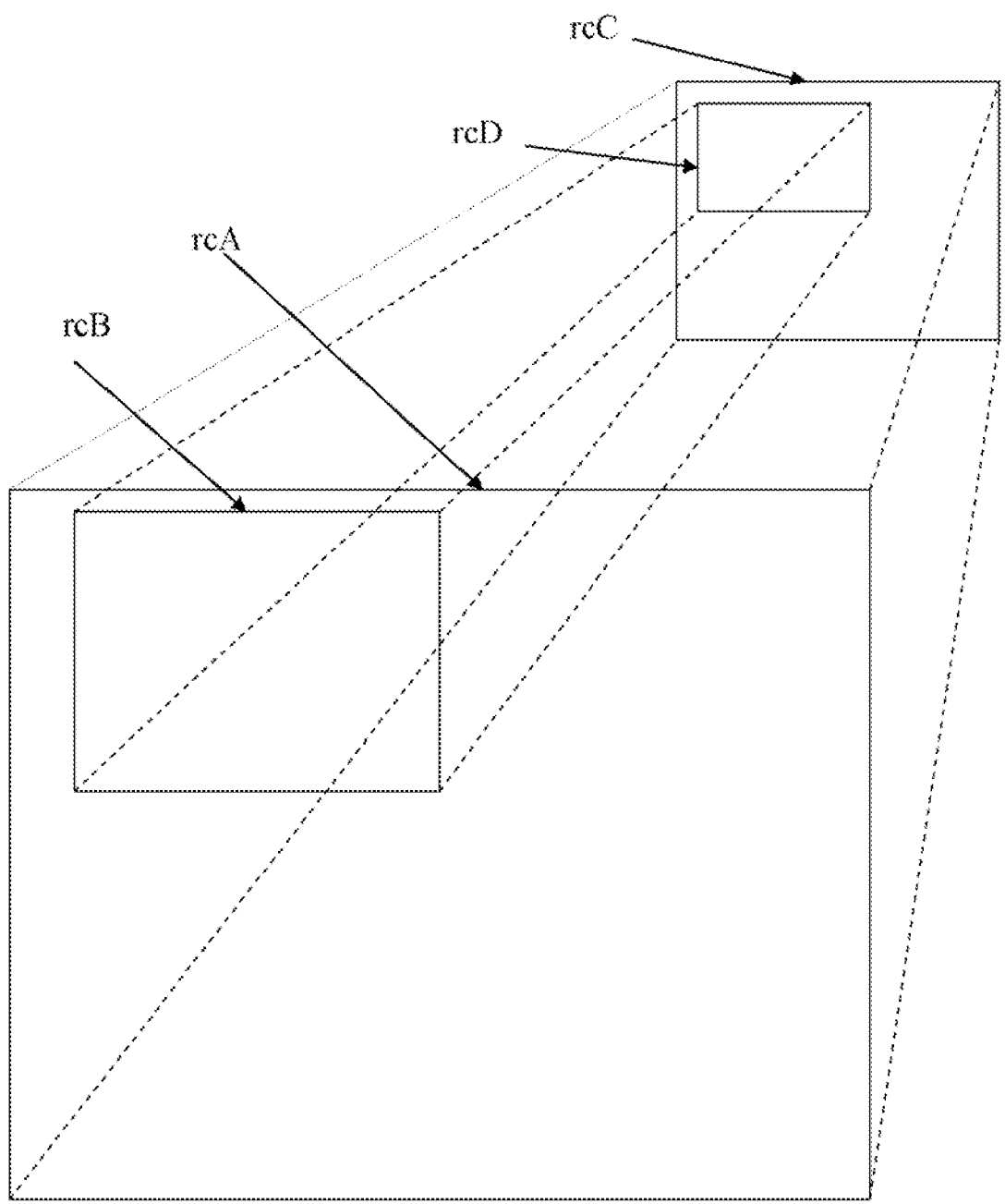
FIG. 5 is a schematic diagram illustrating the approach of coordinate mapping.

The logic rectangle generating sub-module 201 is further configured for generating an image rcC by reducing the logic rectangle rcA by the reduction scale S and a coordinate mapping set by the measuring engineer. Referring to the FIG. 5 which illustrating the approach of coordinate mapping.

The combined image generating sub-module 202 is configured for reducing each of the pixel rectangles rcB by the reduction scale S and the coordinate mapping to generate a reduced image rcD and incorporating all the images rcD to the image rcC to generate the combined image of the workpiece 5. The coordinate mapping between each pixel rectangle rcB and each image rcD is the same as the coordinate mapping between the logic rectangle rcA and the image rcC. Referring to the FIG. 5, the logic rectangle rcA includes a plurality of the pixel rectangles rcB generated in accordance to the height and width of the images, for example image1~image10. The image rcC is generated by reducing the logic rectangle rcA by the reduction scale S and the coordinate mapping.

Figure 6:
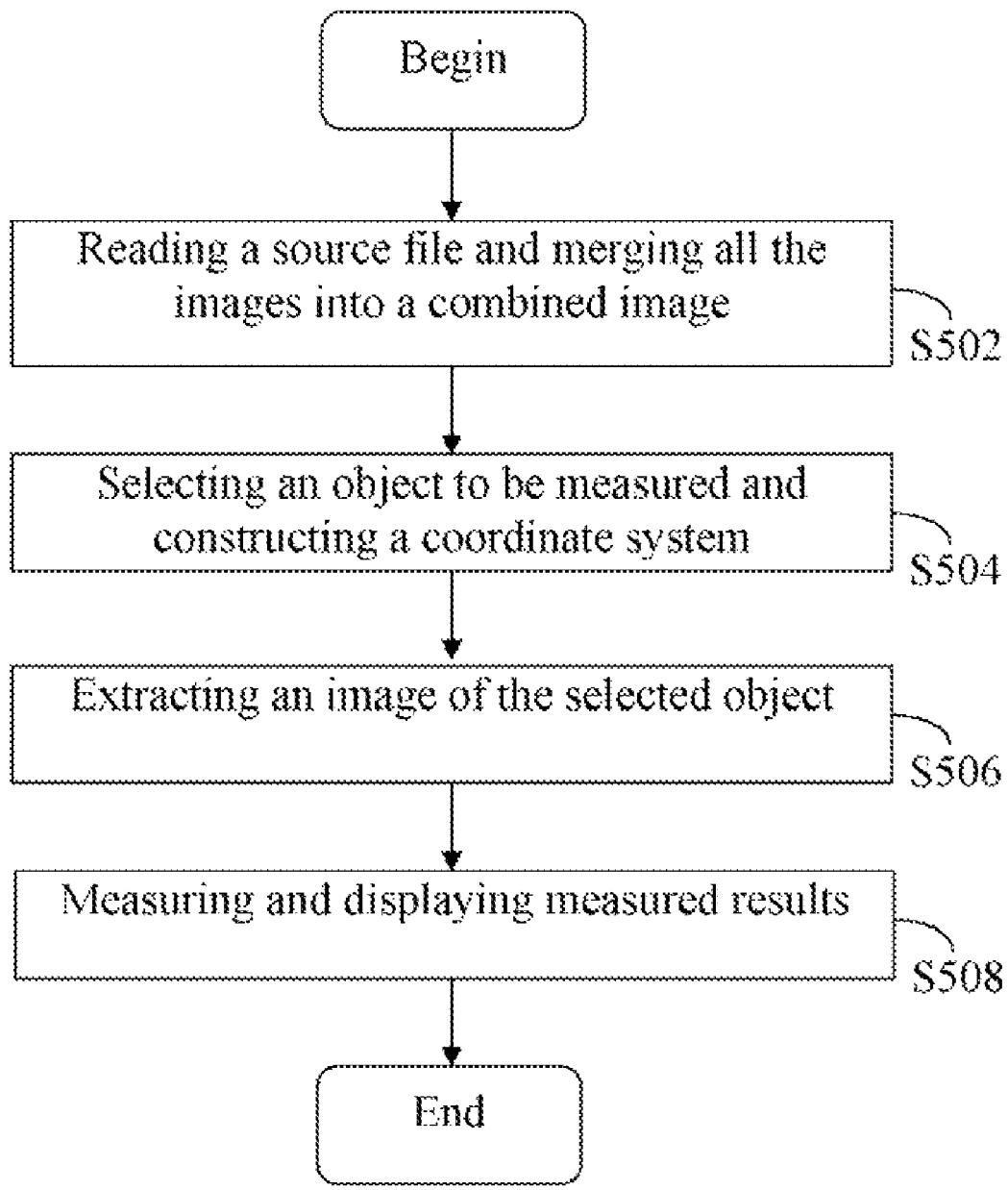
FIG. 6 is a flowchart of a preferred method for measuring digital images of a workpiece in accordance with a preferred embodiment.

FIG. 6 is a flowchart of a preferred method for measuring digital images of a workpiece in accordance with a preferred embodiment.

In step S502, the client computer 2 obtains a source file from the measuring computer 1 via copying or a network. The image merging module 20 reads images of the workpiece in the source file and merges all the images to generate a combined image of the workpiece 5. The source file stores the images of the workpiece 5 obtained from the image retrieving card 10 by the image storing module 11.

In step S504, the selecting module 23 selects an object to be measured on the combined image. The selected object may be a point, a line, a plane, a circle, i.e. The coordinate system maintenance module 21 constructs a new coordinate system according to the predetermined elements, which include datum mark, datum line, and datum plane etc. The coordinate system maintenance module 21 converts original coordinates of the measuring points on the selected object into coordinates based on the new coordinate system. The displaying module 24 displays the new coordinate system and the selected object.

In step S506, the image extracting module 22 extracts a selected image of the selected object from the combined image. The extracted image may be one of the images captured by the CCD 7, and is stored in the source file. The extracted image may also be a new image centers on the selected object, and made out of several portions of the images that collectively forms the selected image. The displaying module 24 displays the extracted image.

In step S508, the measuring module 25 selects the measuring tools to measure the selected object on the extracted image. The displaying module 24 displays measured results. The programming module 26 records the measuring procedures, in order, such as selecting the measuring tools, or calculating a length of a line segment, i.e., and saves all of the measuring procedures into a measuring program. The measuring program can be invoked to perform the measuring procedures automatically.

Figure 7:
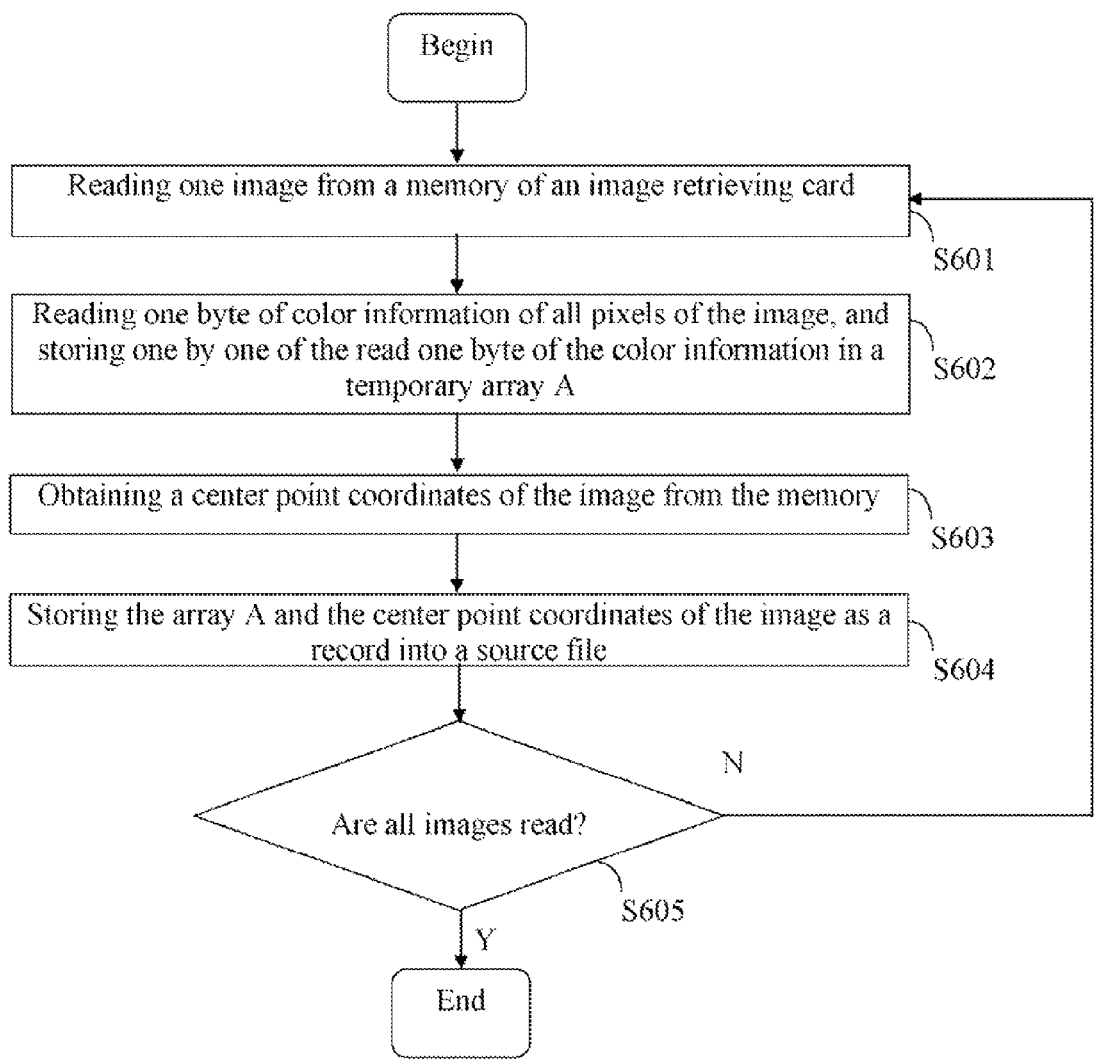
FIG. 7 is a flow chart illustrating a method for capturing images of a workpiece and storing the digital images in a source file.

FIG. 7 is a flow chart illustrating details of a method for capturing digital images of the workpiece and storing the digital images in the source file. In step S601, the image storing module 11 reads one image from the memory of the image retrieving card 10, such as image 1. Each of the images is stored in the memory as a bitmap (BMP) file. The BMP file may be 8 bits, 16 bits, 24 bits, or 32 bits. In the preferred embodiment, the images in the memory are all black and white images. Each of the images consists of many pixels and each of the pixels has three bytes of red-green-blue (RGB) color information. For instance, if an exemplary digital image is 1376 pixels wide and 1032 pixels high, the exemplary digital image would have 1376 pixels*1032 pixels; or 1420032 pixels. Each of the pixels is further represented with three bytes of color information. Thus, the exemplary digital image would occupy about 1420032 pixels*3; or 4.16 M bytes. The color information of each of the pixels consists of the red color value, the green color value, and the blue color value. Each of the color values is one byte. The red color value, the green color value, and the blue color value of the each of the pixels uses a same scale and can be 0~255. The red color value, the green color value, and the blue color value of each of the pixels are equal.

In step S602, the image storing module 11 reads a one color value (either of the red color value, the green color value, and the blue color value) of all the pixels of the image1 from the memory, and stores one by one the read color value of all the pixels in the temporary array A. In step S603, the image storing module 11 obtains a center point coordinates of the image 1 from the memory.

In step S604, the image storing module 11 stores the temporary array A representing the image 1's color information and the center point coordinates of the image 1 as a record in the source file in the storage 12 of the measuring computer 1, and the image storing module 11 stores a name of the image1 in the source file in correspondence with the record. In step S605, the image storing module 11 determines whether all the images of the workpiece 5 are read. If all the images of the workpiece 5 are read, the image storing module 11 stores the height and width of the images in the source file, and the procedure goes end. Otherwise, the procedure returns to step S601 described above, and the image storing module 11 reads a next image from the memory of the image retrieving card 10.

Figure 8:
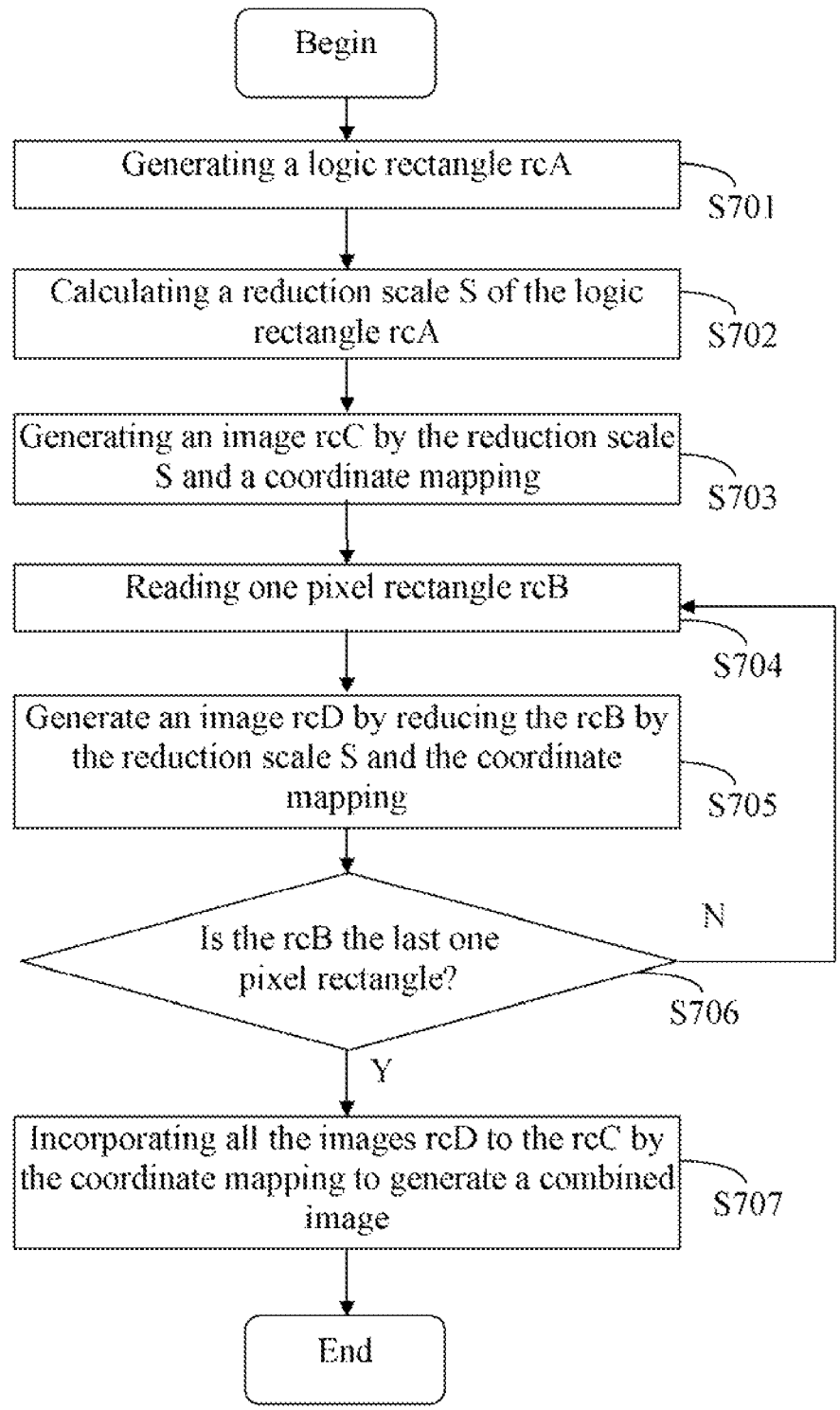
FIG. 8 is a flow chart illustrating details of step S502 in FIG. 6, namely reading the source file and merging all the images into a combined image.

FIG. 8 is a flow chart illustrating details of step S502 in FIG. 6, namely reading a source file and merging all the images to generate a combined image. In step S701, the logic rectangle generating sub-module 201 reads the source file in the storage 12, obtains the height and width of the images, and reads the center points coordinates measured in the physical standard unit such as millimeter or inches. The logic rectangle generating sub-module 201 converts the center point coordinates of the images from the physical standard unit to the pixels unit, generates a pixel rectangle rcB for each of the images according to the obtained height and width, and merges all the generated pixel rectangles rcB according to their center points coordinates in the pixels unit to generate a logic rectangle rcA. The length of the rcA is E, and the width of the rcA is F. The length of each rcB is M, and the width of each rcB is N.

In step S702, the logic rectangle generating sub-module 201 calculates a reduction scale S of the logic rectangle rcA. The reduction scale S equals the greater one of E/M and F/N, that is, if E/M>F/N, S=E/M; otherwise, if E/M<F/N, S=F/N.

In step S703, the logic rectangle generating sub-module 201 generates an image rcC by the reduction scale S and the coordinate mapping set by the measuring engineer.

In step S704, the combined image generating sub-module 202 reads one pixel rectangle rcB. In step S705, the combined image generating sub-module 202 generates an image rcD by reducing the pixel rectangle rcB by the reduction scale S and the coordinate mapping. The coordinate mapping between each pixel rectangle rcB and each image rcD is the same as the coordinate mapping between the logic rectangle rcA and the image rcC. In step S706, the combined image generating sub-module 202 determines whether the pixel rectangle rcB is the last pixel rectangle. If the rcB is not the last pixel rectangle, the procedure returns to step S704. Otherwise, in step S707, the combined image generating sub-module 202 incorporates all the images rcD to the image rcC by the coordinate mapping to generate a combined image.

Figure 9:
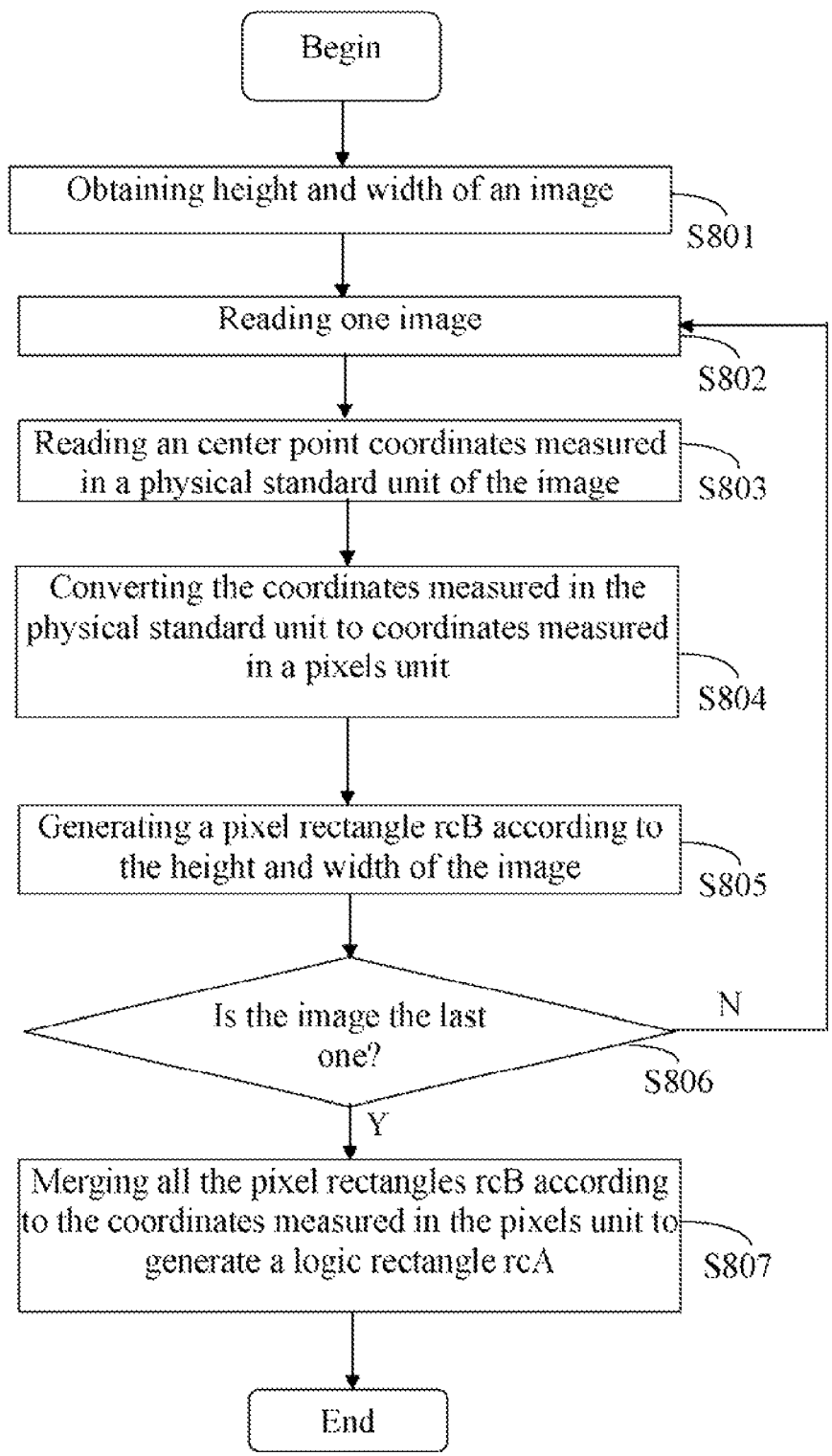
FIG. 9 is a flow chart illustrating details of step S701 in FIG. 8, namely generating a logic rectangle rcA.

FIG. 9 is a flow chart illustrating details of step S701 in FIG. 8, namely generating a logic rectangle rcA. In step S801, the logic rectangle generating sub-module 201 obtains the height and width of the image from the source file. In step S802, the logic rectangle generating sub-module 201 reads one image, such as image 1. In step S803, the logic rectangle generating sub-module 201 reads the center point coordinates of the image in the source file. The coordinates is measured in the physical standard unit. In step S804, the logic rectangle generating sub-module 201 converts the coordinates measured in the physical standard unit to the coordinates measured in the pixels unit. In step S805, the logic rectangle generating sub-module 201 generates the pixel rectangle rcB according to the height and width of the image. In step S806, the logic rectangle generating sub-module 201 determines whether the image is the last image. If the image is not the last image, the procedure returns to step S802. If the image is the last image, in step S807, the logic rectangle generating sub-module 201 merges all the pixel rectangles rcB according to the coordinates measured in the pixels unit to generate the logic rectangle rcA. The logic rectangle rcA is the minimum one of rectangles which includes all the pixel rectangles rcB.

Figure 10:
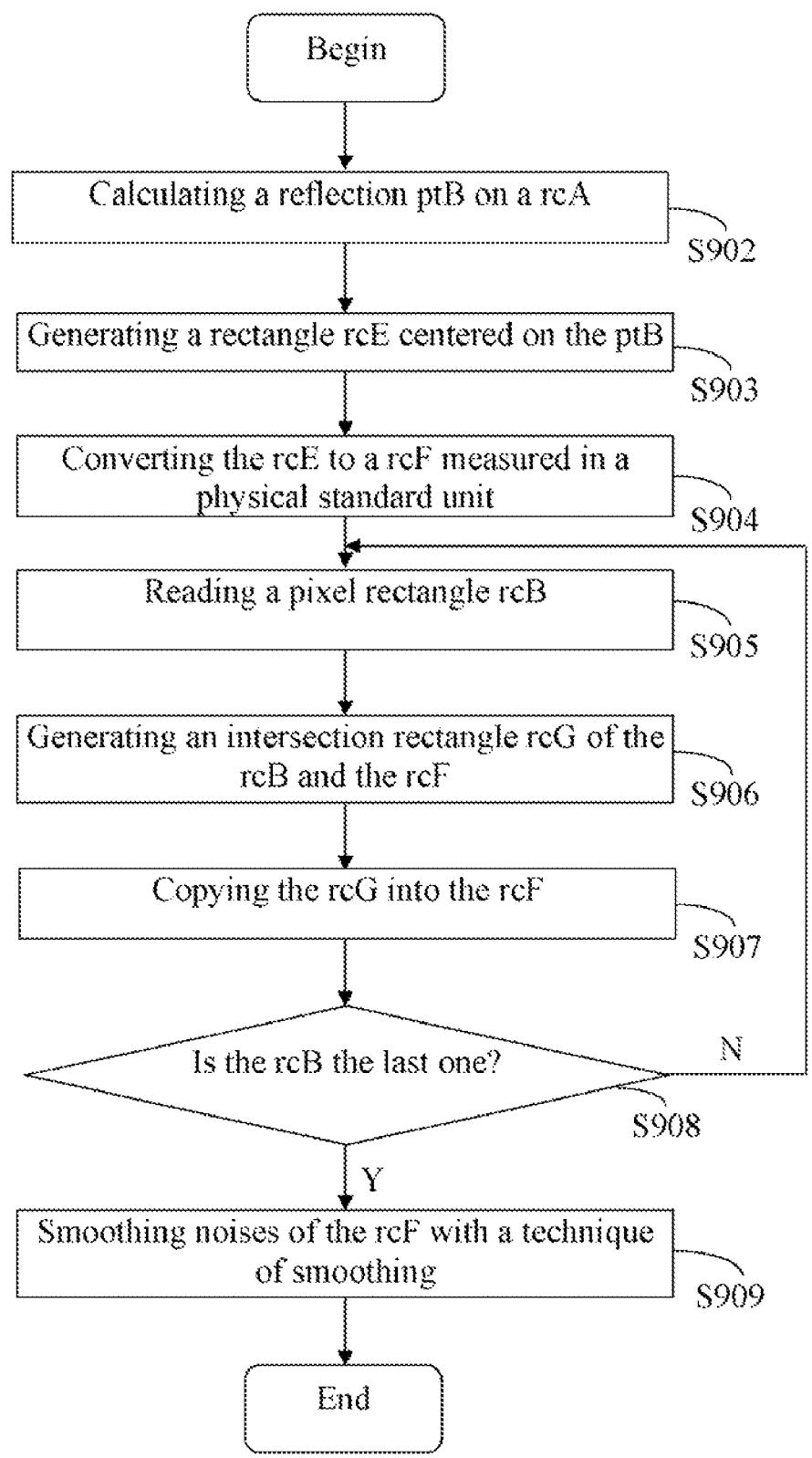
FIG. 10 is a flow chart illustrating details of step S506 in FIG. 6, namely extracting an image of the selected object.

FIG. 10 is a flow chart illustrating details of step S506 in FIG. 6, namely extracting an image of the selected object. In step S902, the image extracting module 22 calculates a reflection ptB of the selected object on the rcA. In step S903, the image extracting module 22 generates a rectangle rcE centered on the ptB, the rcE equals 1/S of the rcA. In step S904, the image extracting module 22 converts the rcE to an rcF measured in the physical standard unit. In step S905, the image extracting module 22 reads a pixel rectangle rcB. In step S906, the image extracting module 22 generates an intersection rectangle rcG of the rcB and the rcF. In step S907, the image extracting module 22 copies the rcG into the rcF; the rcF is the image of the selected object. In step S908, the image extracting module 22 determines whether the reB is the last one pixel rectangle. If the rcB is not the last one pixel rectangle, the procedure returns the step S906 to reads a next pixel rectangle rcB. If the rcB is the last one pixel rectangle, in step S909, the image extracting module 22 smoothes noises of the rcF with a technique of smoothing. The technique of smoothing may be mean filtering, median filtering and adaptive filtering.

It is to be understood that other embodiments may be utilized and structural changes may be made without departing from the scope of the present invention.

What is claimed is:

1. A system for measuring digital images of a workpiece, the system comprising a client computer for measuring the digital images, the client computer comprising an image merging module, a selecting module, an image extracting module, and a measuring module, wherein:
   the images merging module is configured for merging all the digital images in a source file to generate a combined image of the workpiece according to center point coordinates of each of the captured images;
   the images merging module comprising a logic rectangle generating sub-module configured for generating a pixel rectangle rcB for each of the images according to height and width of the images, merging all the pixel rectangles rcB according to the center points coordinates measured in a pixels unit to generate a logic rectangle rcA, and generating an image rcC by reducing the logic rectangle rcA by a reduction scale S and a coordinate mapping, wherein the reduction scale S is the greater one of a length of the logic rectangle rcA divided by the length of the pixel rectangle rcB or a width of the logic rectangle rcA divided by the width of the pixel rectangle rcB;
   the selecting module is configured for selecting an object to be measured on the combined image;
   the image extracting module is configured for extracting an image of the selected object from the combined image;
   the measuring module is configured for measuring the selected object on the extracted image; and
   the client computer connects to a measuring computer for downloading the digital images.

2. The system of claim 1, wherein the measuring computer comprises an image storing module for obtaining the digital images from a measuring machine and storing the digital images into the source file.

3. The system of claim 2, wherein the images merging module further comprises:
   a combined image generating sub-module configured for reducing each of the pixel rectangles rcB by the reduction scale S and the coordinate mapping to generate an image rcD and incorporating all the generated images rcD to the image rcC by the coordinate mapping to generating the combined image of the workpiece.

4. The system of claim 3, wherein the coordinate mapping between each pixel rectangle rcB and each image rcD is the same as the coordinate mapping between the logic rectangle rcA and the image rcC.

5. A computer-based method for measuring digital images of a workpiece, the method comprising:
   obtaining the digital images from a measuring machine and storing the digital images into a source file to a storage of a client computer;
   reading each of the images of different parts of the workpiece from the source file and merging all the images to generate a combined image of the workpiece, wherein the reading step comprises step (a) to (c):
   (a) generating a pixel rectangle rcB for each of the images in the source file according to height and width of the images and a center point coordinates of the images;
   (b) generating a logic rectangle rcA by merging all the pixel rectangles rcB; and
   (c) calculating a reduction scale S of the logic rectangle rcA, wherein the reduction scale S is the greater one of a length of the logic rectangle rcA divided by the length of the pixel rectangle rcB or a width of the logic rectangle rcA divided by the width of the pixel rectangle rcB;
   selecting an object to be measured on the combined image;
   extracting an image of the selected object; and
   measuring the selected object on the extracted image and displaying measuring results on the client computer.

6. The method of claim 5, wherein storing the digital images comprises:
   (a) reading one image of the workpiece;
   (b) reading one byte of color information of all pixels of the image;
   (c) storing one by one the one byte of the color information in a temporary array;
   (d) obtaining a center point coordinates of the image from the measuring machine;
   (e) storing the temporary array and the center point coordinates of the image as a record into the source file;
   (f) storing a name of the image in the source file;
   (g) repeating the steps from (a) to (f) till all the images of the workpiece are read; and
   (h) storing height and width of the images into the source file.

7. The method of claim 5, wherein the merging step comprises:
   generating an image rcC by reducing the logic rectangle rcA by the reduction scale S and a coordinate mapping;
   reducing each of the pixel rectangles rcB by the reduction scale S and the coordinate mapping to generate an image rcD, the coordinate mapping between each pixel rectangle rcB and each corresponding image rcD being the same as the coordinate mapping between the logic rectangle rcA and the image rcC; and
   incorporating all the generated images rcD to the image rcC by the coordinate mapping to generate a combined image of the object.

* * * * *